(12) United States Patent
Lima et al.

(10) Patent No.: US 10,717,844 B2
(45) Date of Patent: Jul. 21, 2020

(54) MULTILAYER CONFORMABLE COMPOSITES

(71) Applicant: Lintec of America, Inc., Richardson, TX (US)

(72) Inventors: Marcio D. Lima, Richardson, TX (US); Julia Bykova, Richardson, TX (US)

(73) Assignee: Lintec Corporation, Richardson, TX (US)

( * ) Notice: Subject to any disclaimer, the term of this patent is extended or adjusted under 35 U.S.C. 154(b) by 0 days.

(21) Appl. No.: 15/916,368

(22) Filed: Mar. 9, 2018

(65) Prior Publication Data

US 2018/0194109 A1 Jul. 12, 2018

Related U.S. Application Data

(63) Continuation of application No. PCT/US2016/051742, filed on Sep. 14, 2016.

(30) Foreign Application Priority Data

Sep. 14, 2015 (JP) .................................. 2015-180950

(51) Int. Cl.
*C08K 3/04* (2006.01)
*B32B 5/02* (2006.01)
(Continued)

(52) U.S. Cl.
CPC ................ *C08K 3/041* (2017.05); *B32B 5/02* (2013.01); *B32B 5/12* (2013.01); *B32B 7/06* (2013.01);
(Continued)

(58) Field of Classification Search
CPC ......... Y10T 428/249945; Y10T 428/30; Y10T 428/2918; Y10T 428/2991; Y10T 428/292; G02B 1/105; G02B 1/14; B82Y 30/00; B82Y 40/00; B32B 2255/205; B32B 2260/021; B32B 2605/006; B32B 27/04; B32B 27/06; B32B 27/08; B32B 5/04;
(Continued)

(56) References Cited

U.S. PATENT DOCUMENTS

| 4,258,100 A | 3/1981 | Fujitani et al. |
| 4,301,040 A | 11/1981 | Berbeco |

(Continued)

FOREIGN PATENT DOCUMENTS

| CN | 102026066 | 4/2011 |
| CN | 104125925 | 10/2014 |

(Continued)

OTHER PUBLICATIONS

Extended European Search Report received for EP Application No. 16847213.2, dated Aug. 8, 2018, 4 pages.
(Continued)

*Primary Examiner* — Camie S Thompson
(74) *Attorney, Agent, or Firm* — Finch & Maloney PLLC

(57) ABSTRACT

A composite including a heat conformable polymer and a nanofiber sheet is disclosed. The heat conformable polymer can be a hot melt adhesive, and the combination can provide an electrically conductive hot melt adhesive composite. The nanofiber layer is protected and the composite is conformable and/or can be adhered to a variety of surfaces.

16 Claims, 11 Drawing Sheets

(51) Int. Cl.

| | | |
|---|---|---|
| *B32B 7/12* | (2006.01) | |
| *C09J 9/02* | (2006.01) | |
| *C09J 7/38* | (2018.01) | |
| *C09J 7/22* | (2018.01) | |
| *C08J 5/18* | (2006.01) | |
| *C08J 7/04* | (2020.01) | |
| *B32B 5/12* | (2006.01) | |
| *B32B 7/06* | (2019.01) | |
| *B32B 15/14* | (2006.01) | |
| *C09J 201/02* | (2006.01) | |
| *B32B 9/00* | (2006.01) | |
| *B32B 17/10* | (2006.01) | |
| *B32B 27/30* | (2006.01) | |
| *C08J 5/04* | (2006.01) | |
| *C08L 23/08* | (2006.01) | |
| *C08L 29/14* | (2006.01) | |
| *C08K 3/08* | (2006.01) | |
| *C08K 7/06* | (2006.01) | |
| *B32B 9/04* | (2006.01) | |
| *B82Y 40/00* | (2011.01) | |

(52) U.S. Cl.
CPC ............... *B32B 7/12* (2013.01); *B32B 9/007* (2013.01); *B32B 15/14* (2013.01); *B32B 17/10889* (2013.01); *B32B 27/30* (2013.01); *C08J 5/042* (2013.01); *C08J 5/18* (2013.01); *C08J 7/0427* (2020.01); *C08K 3/08* (2013.01); *C08L 23/0853* (2013.01); *C08L 29/14* (2013.01); *C09J 7/22* (2018.01); *C09J 7/38* (2018.01); *C09J 9/02* (2013.01); *C09J 201/02* (2013.01); *B32B 9/043* (2013.01); *B32B 17/10788* (2013.01); *B32B 2260/021* (2013.01); *B32B 2260/046* (2013.01); *B32B 2307/202* (2013.01); *B32B 2307/732* (2013.01); *B32B 2307/748* (2013.01); *B32B 2311/18* (2013.01); *B82Y 40/00* (2013.01); *C08J 2383/04* (2013.01); *C08J 2483/04* (2013.01); *C08K 3/04* (2013.01); *C08K 3/042* (2017.05); *C08K 3/045* (2017.05); *C08K 7/06* (2013.01); *C08K 2003/0831* (2013.01); *C08K 2003/0881* (2013.01); *C08K 2201/011* (2013.01); *C09J 2201/16* (2013.01); *C09J 2201/602* (2013.01); *C09J 2201/606* (2013.01); *C09J 2205/10* (2013.01); *C09J 2205/102* (2013.01)

(58) Field of Classification Search
CPC .... B32B 9/007; Y10S 977/742; Y10S 977/75; C01B 2202/22; C01B 32/168; C08K 3/041; C08K 3/08; C08K 3/042; C08K 3/04; C08K 2003/0831; C08K 2003/0881; C09J 7/38; C09J 7/33; C09J 7/0427; C09J 7/06; C09J 9/02; C08J 2383/04
USPC .......... 428/299.1, 297.4; 977/742; 427/299.1
See application file for complete search history.

(56) References Cited

U.S. PATENT DOCUMENTS

| | | | |
|---|---|---|---|
| 4,874,549 A | 10/1989 | Michalchik | |
| 4,943,978 A | 7/1990 | Rice | |
| 5,925,275 A | 7/1999 | Lawson et al. | |
| 7,067,328 B2 | 6/2006 | Dubrow et al. | |
| 7,462,498 B2 | 12/2008 | Mao et al. | |
| 7,622,314 B2 | 11/2009 | Liang | |
| 7,641,885 B2 | 1/2010 | Liu et al. | |
| 7,648,406 B2 | 1/2010 | Tai et al. | |
| 7,662,467 B2 | 2/2010 | Li et al. | |
| 7,811,149 B2 | 10/2010 | Liu et al. | |
| 7,854,992 B2 | 12/2010 | Fu et al. | |
| 7,947,145 B2 | 5/2011 | Wang et al. | |
| 8,007,617 B2 | 8/2011 | Min et al. | |
| 8,076,829 B2 | 12/2011 | Chen et al. | |
| 8,084,097 B2 | 12/2011 | Fisher et al. | |
| 8,318,033 B2 | 11/2012 | Fu et al. | |
| 8,351,220 B2 | 1/2013 | Liang et al. | |
| 8,974,960 B2 | 3/2015 | Manthiram et al. | |
| 9,067,791 B2 | 6/2015 | Kim et al. | |
| 9,095,639 B2 | 8/2015 | Ajayan et al. | |
| 2005/0062024 A1 | 3/2005 | Bessette et al. | |
| 2006/0057388 A1 | 3/2006 | Jin et al. | |
| 2007/0012900 A1 | 1/2007 | Callen et al. | |
| 2008/0245548 A1 | 10/2008 | Fu et al. | |
| 2008/0292840 A1 | 11/2008 | Majumdar et al. | |
| 2009/0047513 A1 | 2/2009 | Lashmore | |
| 2009/0068387 A1 | 3/2009 | Panzer et al. | |
| 2009/0159198 A1 | 6/2009 | Wang et al. | |
| 2009/0264036 A1 | 10/2009 | Yano et al. | |
| 2010/0003877 A1 | 1/2010 | Fan et al. | |
| 2010/0009267 A1 | 1/2010 | Chase et al. | |
| 2010/0098931 A1 | 4/2010 | Daniel et al. | |
| 2010/0261058 A1 | 10/2010 | Lopatin et al. | |
| 2010/0296677 A1 | 11/2010 | Jiang et al. | |
| 2010/0311866 A1 | 12/2010 | Huang et al. | |
| 2011/0007477 A1 | 1/2011 | Xu et al. | |
| 2011/0069860 A1 | 3/2011 | Liu et al. | |
| 2011/0159269 A1* | 6/2011 | Qian ..................... B32B 27/04 428/299.1 |
| 2011/0160372 A1 | 6/2011 | Youm et al. | |
| 2011/0259518 A1 | 10/2011 | Tojo et al. | |
| 2013/0118682 A1 | 5/2013 | Zeininger | |
| 2013/0171406 A1 | 7/2013 | Suehiro et al. | |
| 2013/0341081 A1 | 12/2013 | Liang et al. | |
| 2014/0035708 A1 | 2/2014 | Athanasiou et al. | |
| 2014/0124495 A1 | 5/2014 | Feng et al. | |
| 2014/0151111 A1 | 6/2014 | Shah et al. | |
| 2014/0287641 A1 | 9/2014 | Steiner, III | |
| 2015/0014047 A1 | 1/2015 | Hutchison et al. | |
| 2015/0034859 A1 | 2/2015 | Compton et al. | |
| 2015/0044656 A1 | 2/2015 | Eichhorn et al. | |
| 2015/0118514 A1 | 4/2015 | Zhao et al. | |
| 2015/0140888 A1 | 5/2015 | Lee et al. | |
| 2015/0147573 A1 | 5/2015 | Zhang et al. | |
| 2015/0191636 A1 | 7/2015 | Otaka et al. | |
| 2018/0043665 A1 | 2/2018 | Ovalle | |
| 2018/0194101 A1 | 7/2018 | Lima et al. | |

FOREIGN PATENT DOCUMENTS

| | | |
|---|---|---|
| DE | 3146235 | 5/1983 |
| EP | 0342258 | 11/1989 |
| JP | 05013983 A | 1/1993 |
| JP | 2000027072 A | 1/2000 |
| JP | 2003336166 A | 11/2003 |
| JP | 2004269878 A | 9/2004 |
| JP | 2005007861 A | 1/2005 |
| JP | 2005063994 A | 10/2005 |
| JP | 2008145208 A | 6/2008 |
| JP | 2008523254 A | 7/2008 |
| JP | 2009542860 A | 12/2009 |
| JP | 2010006663 A | 1/2010 |
| JP | 201535333 A | 11/2010 |
| JP | 2014508054 A | 4/2014 |
| JP | 2015528827 A | 10/2015 |
| JP | 2015-211180 A | 11/2015 |
| WO | 2005/070656 | 8/2005 |
| WO | 2005070656 A2 | 8/2005 |
| WO | 2007015710 A2 | 2/2007 |
| WO | 2008005782 A2 | 1/2008 |
| WO | 2009106389 A2 | 2/2009 |
| WO | 2012094398 A1 | 7/2012 |
| WO | 2013/162649 | 10/2013 |
| WO | 2013183882 A1 | 12/2013 |
| WO | 2014-089081 | 6/2014 |

(56) References Cited

FOREIGN PATENT DOCUMENTS

WO    2016126827 A1    8/2016
WO    2016136686 A1    11/2017

OTHER PUBLICATIONS

Partial Supplementary European Search Report received for EP Application No. 168472704.1, dated Aug. 8, 2018, 12 pages.
Non-Final Rejection, received in U.S. Appl. No. 15/915,608, dated Aug. 30, 2018, 19 pages.
Duncan et al., "Techniques for Characterising the Wetting, Coating and Spreading of Adhesives on Surfaces", National Physical Laboratory, Mar. 2005, NPL Report DEPC-MPR-020, Middlesex, UK, 48 pages.
International Preliminary Report on Patentability received for Patent Application No. PCT/US2016/051672, dated Mar. 29, 2018, 9 pages.
International Preliminary Report on Patentability received for Patent Application No. PCT/US2016/051686, dated Mar. 29, 2018, 7 pages.
International Preliminary Report on Patentability received for Patent Application No. PCT/US2016/051689, dated Mar. 29, 2018, 8 pages.
International Preliminary Report on Patentability received for Patent Application No. PCT/US2016/051742, dated Mar. 29, 2018, 9 pages.
International Search Report and Written Opinion received for Patent Application No. PCT/US2016/051672, dated Dec. 20, 2016, 12 pages.
International Search Report and Written Opinion received for Patent Application No. PCT/US2016/051686, dated Jan. 9, 2017, 14 pages.
International Search Report and Written Opinion received for Patent Application No. PCT/US2016/051689, dated Jan. 30, 2017, 15 pages.
International Search Report and Written Opinion received for Patent Application No. PCT/US2016/051742, dated Dec. 19, 2016, 12 pages.
Munir, et al., "Carbon Nanotube Reinforced Titanium Metal Matrix Composites Prepared by Powder Metallurgy—A Review", Critical Reviews in Solid State and Material Sciences, 0:1-18, Aug. 2014, 19 pages.
Zou, et al, "Carbide-Forming Groups IVB-VIB Metals: A New Territory in the Periodic Table for CVD Growth of Graphene", Nano Letters, American Chemical Society, ACS Publications, May 29, 2014, vol. 14, pp. 3832-3839.
Non-Final Office Action and Search Report for Taiwan Patent Application No. 105130024, dated Aug. 22, 2017, 11 pages.
Extended European Search Report received for EP Application No. 16847234.8, dated Jun. 4, 2019. 8 pages.
Japanese Office Action received for JP Application No. 2018-532545, dated Mar. 22, 2019. 4 pages.
Japanese Office Action received for JP Application No. 2018-532541, dated Mar. 29, 2019. 4 pages.
English Translation of KR Office Action received for KR Application No. 10-2018-7007498, dated Mar. 15, 2019. 2 pages.
European Communication pursuant to Article 94(3) EPC received for EP Application No. 16847204.1, dated Mar. 8, 2019. 9 pages.
English Translation of KR Office Action received for KR Application No. 10-2018-7007603, dated Mar. 18, 2019. 2 pages.
English Translation of CN Office Action and Search Report received for CN Application No. 201680053360.5, dated Jul. 30, 2019. 10 pages.
English Translation of CN Office Action and Search Report received for CN Application No. 201680053441.5, dated Jul. 29, 2019. 3 pages.
Supplementary European Search Report received for EP Application No. 168472704.1, dated Oct. 29, 2018, 6 pages.
Notice of Allowance received for U.S. Appl. No. 15/915,608, dated Nov. 8, 2018, 26 pages.

\* cited by examiner

Drawing a nanofiber sheet from a nanofiber forest

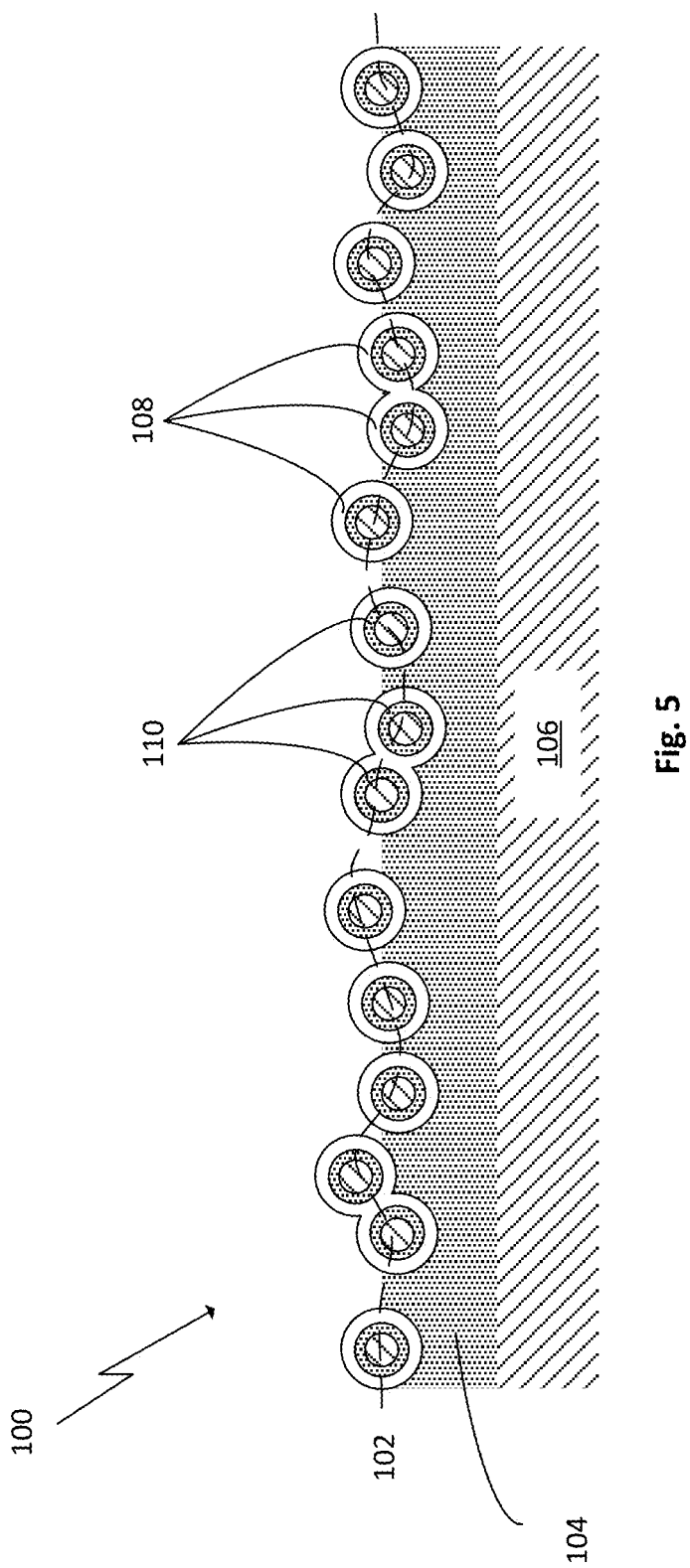

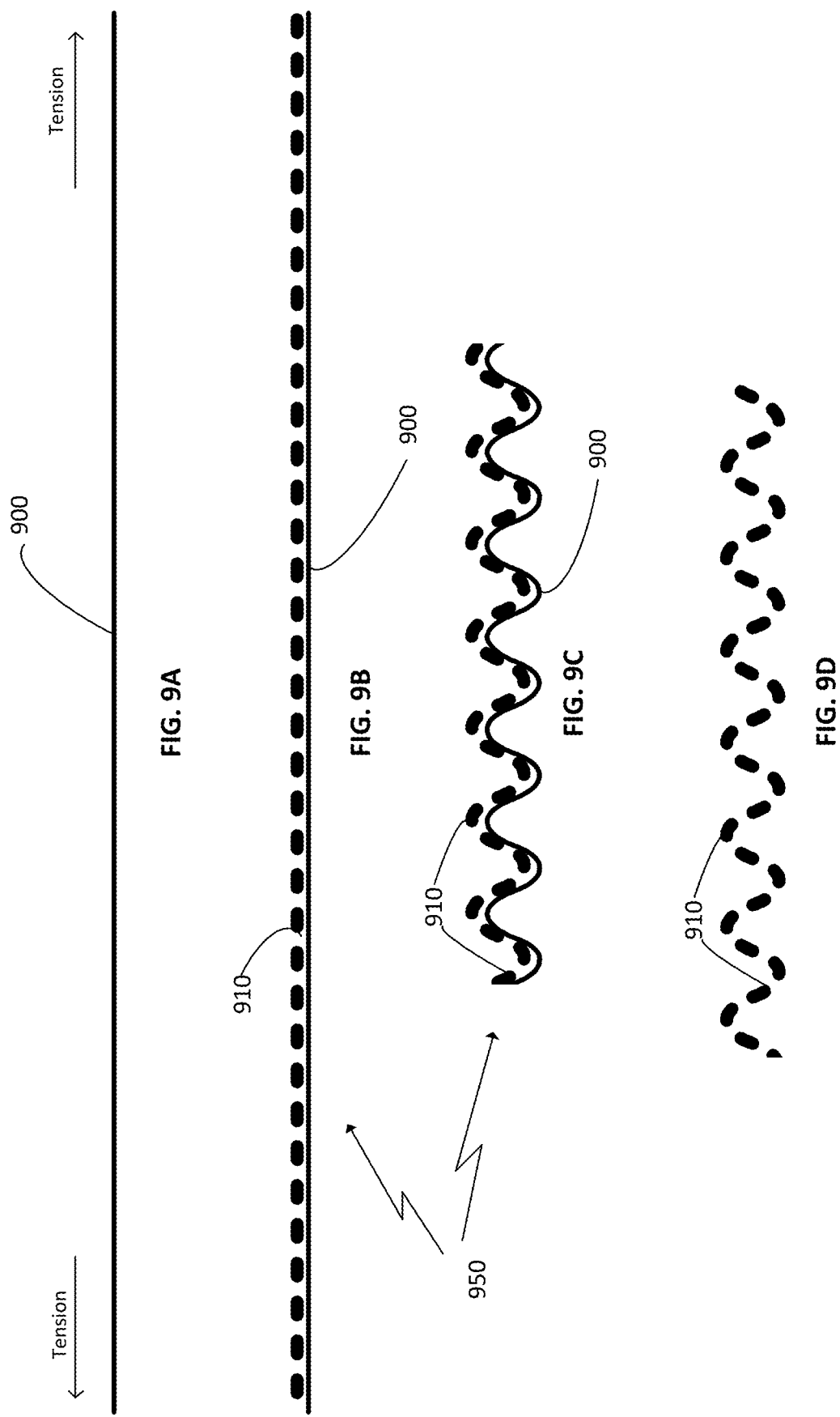

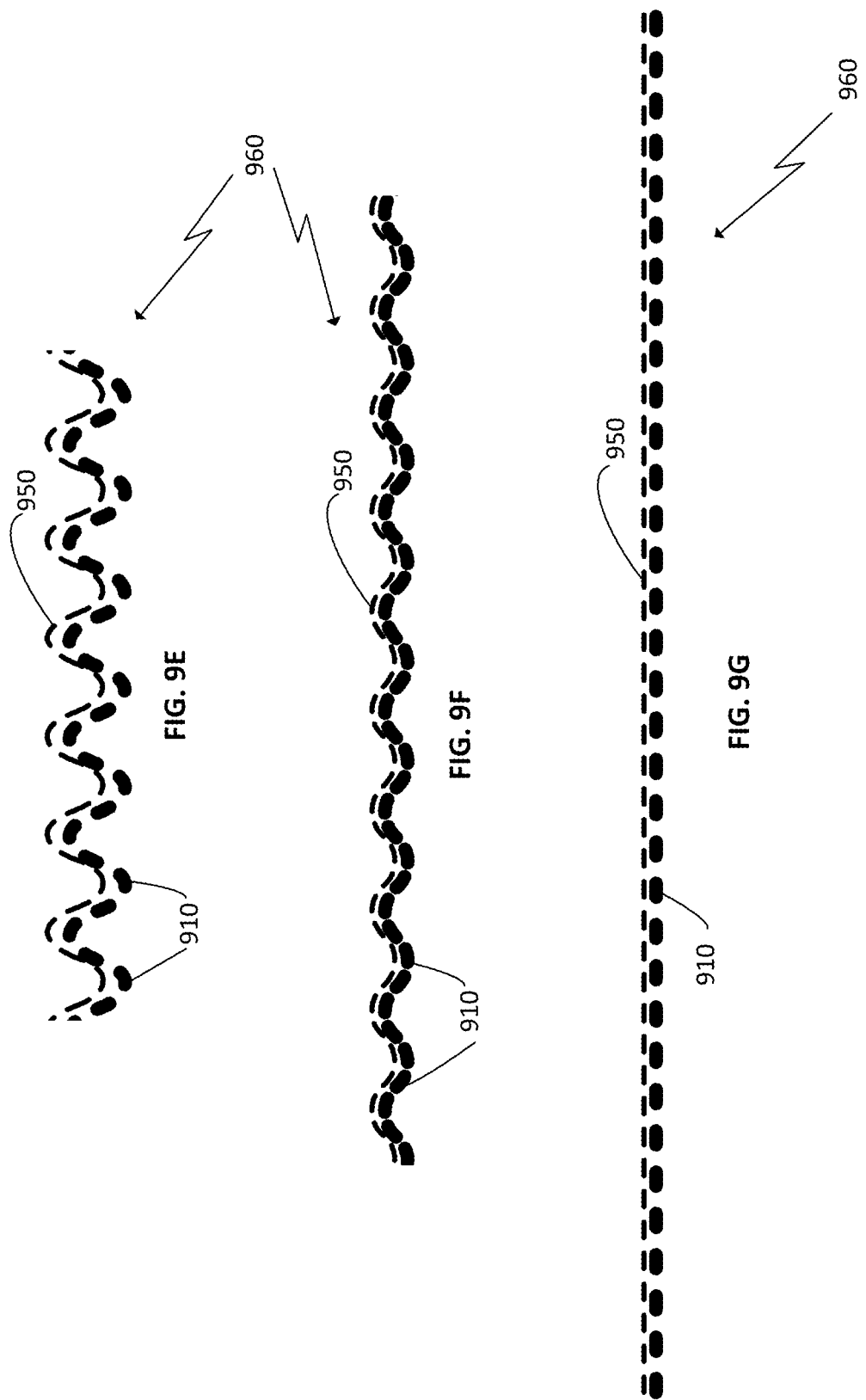

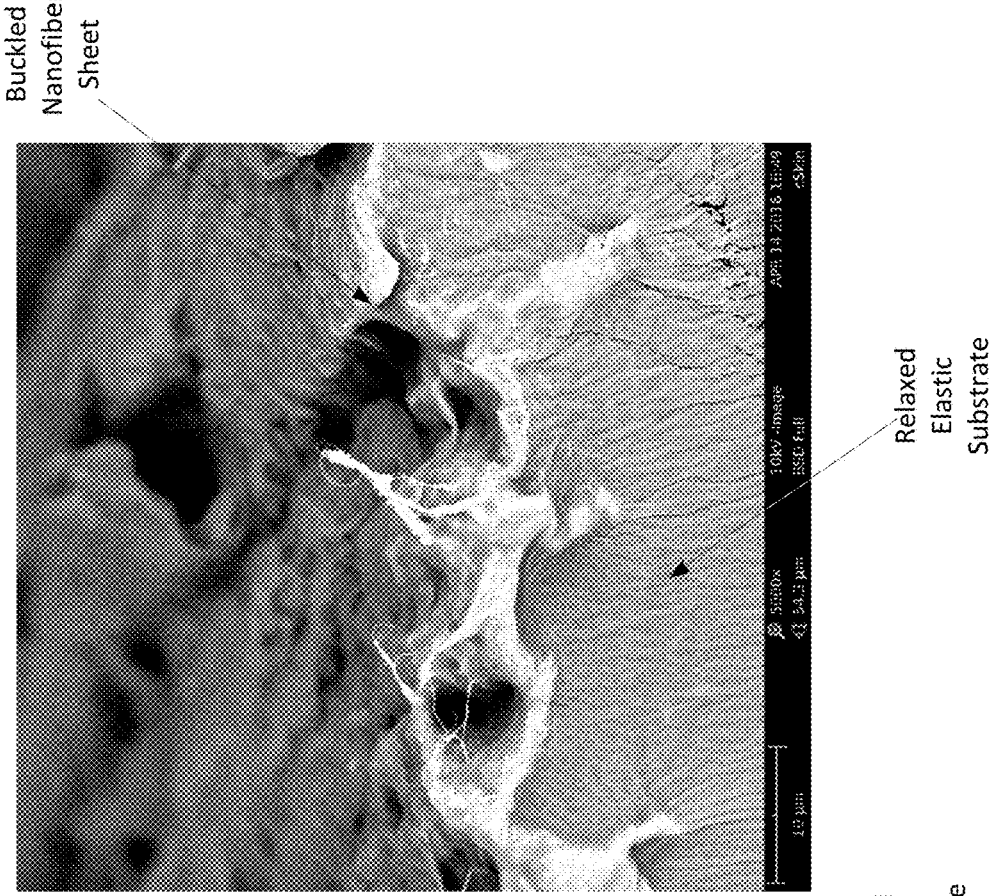
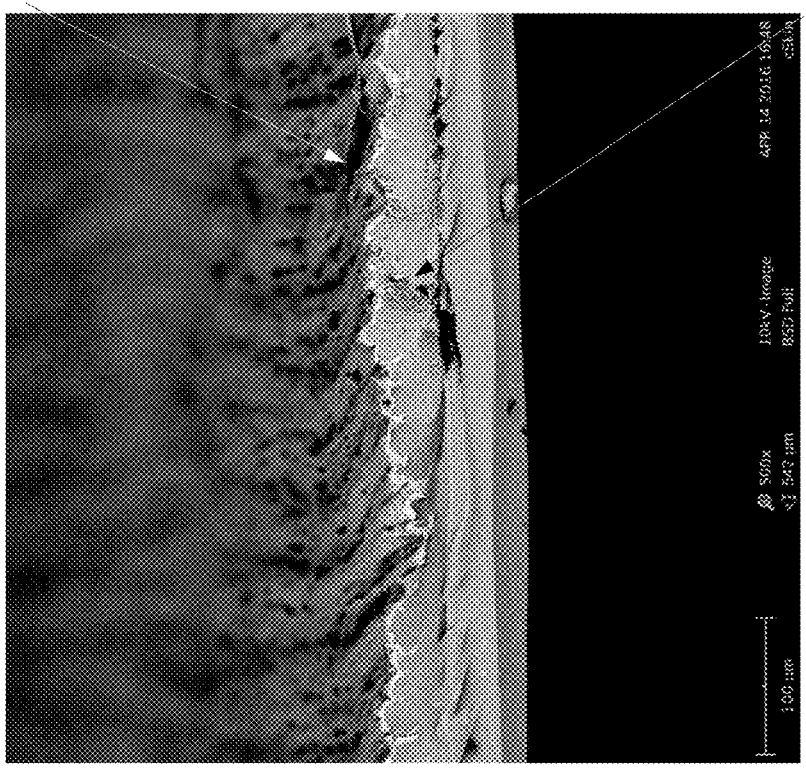
FIG. 11A
FIG. 11B

MULTILAYER CONFORMABLE COMPOSITES

RELATED APPLICATIONS

The present application is a continuation application under 35 U.S.C. § 111(a) of PCT Application No. US2016/51742 filed on Sep. 14, 2016, which claims priority to Japanese Patent Application No. 2015-180950 filed on Sep. 14, 2015, all of which are incorporated herein in their entireties.

FIELD OF THE INVENTION

The disclosure relates to multilayer composites comprising layers of nanofiber sheets and polymers, and, in particular, to composites of carbon nanotube sheets and deformable polymers.

BACKGROUND

Sheets composed of carbon nanotubes (CNTs) can be thin, strong, and flexible and possess unique electrical properties. However, these sheets are difficult to shape and to integrate with additional components, so the use of CNTs in composites has been limited.

SUMMARY

In one aspect, a nanofiber composite is provided, the nanofiber composite comprising a nanofiber sheet comprising nanotubes and a heat conformable polymer layer adhered to the nanofiber sheet. The nanotubes of the nanofiber composite can comprise carbon nanotubes. The nanotubes may be single walled or multiwalled. The nanofiber sheet may have a thickness of less than 100 nm. The nanofiber sheet can be drawn from a nanofiber forest and may be embedded in the polymer layer. The nanofiber sheet may have an electrical resistance of less than 1000 ohms per square. The composite may include a metal layer on a surface of the nanofiber sheet. Any number of nanofiber sheets may be used, and the sheets can be in electrical contact with each other or may be electrically isolated from each other. The conformable polymer layer can be layered between a plurality of nanofiber sheets, and in some composites a portion of the metal layer is exposed through the polymer. The polymer can be selected from ABS, HDPE, LDPE, PP, PVB, PVA, HIPS, PETG, PC, acrylic polymers and mixtures and copolymers thereof. The conformable polymer can have a $T_g$ of less than 200° C., less than 150° C., less than 100° C., less than 75° C. or less than 50° C. The conformable polymer can have a $T_g$ greater than 200° C., greater than 150° C., greater than 100° C., greater than 50° C. or greater than 25° C. The nanofiber composite can transmit greater than 50%, greater than 75%, greater than 90%, greater than 95%, greater than 98% or greater than 99% of incident visible light. It may further comprise glass, ceramic or a transparent polymer. The nanofiber composite can comprise polyvinyl butyral or ethylene-vinyl acetate, and may be a vehicle windshield or window. The windshield or window can include two electrical contacts.

In another aspect, a method of making a nanofiber composite is provided, the method comprising joining a nanofiber sheet to a heat conformable polymer at a temperature higher than the $T_g$ of the heat conformable polymer to form the nanofiber composite and cooling the nanofiber composite to below the $T_g$ of the conformable polymer to form the nanofiber composite. The nanofiber sheet can comprise carbon nanotubes which may be single walled or multiwalled nanotubes. The nanofibers of the nanofiber sheet can be metallized. The method can include joining a plurality of nanofiber sheets with one or more layers of heat conformable polymer layers. The nanofiber sheet and the heat conformable polymer can be passed through a pair of opposed rollers to embed the nanofiber sheet and polymer together. A plurality of nanofiber sheets can be joined to the heat conformable layer, and a plurality of conformable layers can be joined to one or more nanofiber sheets.

In another aspect, a method is provided, the method comprising applying heat to a composite comprising at least one nanofiber sheet and at least one heat conformable polymer, altering the shape of the nanofiber composite to conform to an underlying device, and allowing the nanofiber composite to cool to stiffen the nanofiber composite into a shape that joins the nanofiber composite to the device. The shape of the composite may be altered by gravity or vacuum or by pressing the surface of the nanofiber composite to conform the nanofiber composite to a device. The device can be an electronic device, and the nanofiber composite can reduce the amount of electromagnetic radiation reaching the device. The nanofiber sheet can comprise carbon nanotubes, and the nanotubes in the sheet can be metallized. The heat can be applied by joule heating, inductive heating, radiative heating, conductive heating or convective heating. The nanofiber composite can be heated by heating the nanofiber layer and this can be by joule heating or by inductive heating.

BRIEF DESCRIPTION OF THE DRAWINGS

FIG. 5 provides a schematic cross-sectional view of an embodiment of a nanofiber composite, viewing down the axis of the nanofibers;

FIGS. 9A-9G illustrate the construction of one embodiment of a nanofiber composite;

FIGS. 11A and 11B are copies of photomicrographs showing another embodiment of a nanofiber substrate.

Figure 1:
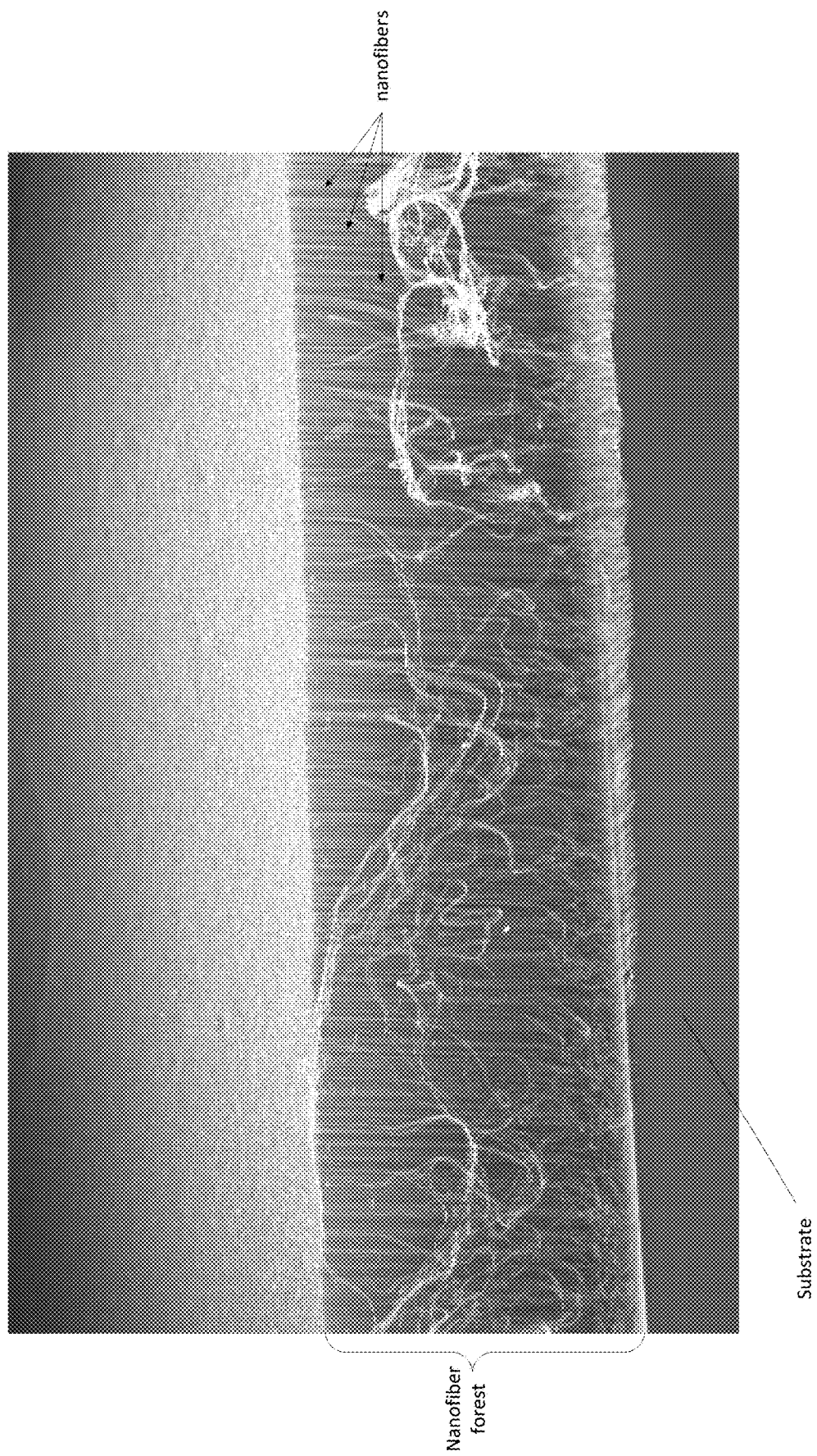
FIG. 1 is a copy of a photomicrograph showing one embodiment of a carbon nanotube forest.

The figures depict various embodiments of the present disclosure for purposes of illustration only. Numerous variations, configurations, and other embodiments will be apparent from the following detailed discussion.

DETAILED DESCRIPTION

Properties of Carbon Nanofibers and Carbon Nanofiber Sheets

As used herein, the term "nanofiber" means a fiber having an average diameter of less than 1 µm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be used to fabricate nanofiber sheets using the techniques described below. Both carbon-based materials (e.g., carbon nanotubes) and non-carbon-based materials may be considered "nanofibers" for the purposes of this disclosure.

As used herein, the terms "nanofiber" and "carbon nanotube" encompass both single walled carbon nanotubes and/or multi-walled carbon nanotubes in which carbon atoms are linked together to form a cylindrical structure. Multi-walled nanotubes have two or more walls. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest").

The dimensions of carbon nanotubes can vary greatly depending on production methods used. For example, the diameter of a carbon nanotube having one, two, three, four or more walls may be from 0.4 nm to 100 nm and in some cases may be between 1 nm and 80 nm, between 10 and 70 nm, or between 20 and 50 nm. In some embodiments, the length of a carbon nanotube may range from 10 µm to greater than 55.5 cm and in some embodiments may be between 20 µm and 50 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or tunable. While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

While many intriguing properties of carbon nanotubes have been identified, harnessing the properties of carbon nanotubes in practical applications requires scalable and controllable production methods that allow the features of the carbon nanotubes to be maintained or enhanced. Methods and devices are disclosed herein that provide for the controlled assembly of carbon nanotubes in various configurations. For example, methods of assembling aligned carbon nanotubes on a substrate or in free-standing form are disclosed. In addition to other features, the disclosed methods allow carbon nanotubes to be successfully transferred without disrupting alignment, allow the density of the carbon nanotube configuration to be controlled and provide opportunity for optical tuning.

Nanofiber Forest

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially aligned with one another on a substrate. The nanofibers, particularly at their base, are substantially normal to the substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

In some embodiments, the nanofibers of the forest may each be oriented toward the substrate at approximately the same angle. For example, the nanofibers of the forest may have an average angle of between 45° and 135° in relation to the substrate. In particular embodiments, the average nanofibers of the forest may be oriented between 75° and 105° from the substrate and in select embodiments the average nanofibers may be oriented approximately 90° from the substrate.

Nanofiber forests as disclosed herein may be relatively dense. Specifically, the disclosed nanofiber forests, including those with 3, 4, 5 or more walls, may have a density on the substrate of at least $10^9$ nanofibers/cm². In some specific embodiments, a nanofiber forest as described herein may have a density of greater than $10^9$ nanofibers/cm², greater than $10^{10}$ nanofibers/cm², greater than $2 \times 10^{10}$ nanofibers/cm² or greater than $3 \times 10^{10}$ nanofibers/cm². In other embodiments, the density of the nanofiber forest in nanofibers/cm² can be between $10^9$ and $3 \times 10^{10}$, between $10^{10}$ and $3 \times 10^{10}$, between $10^{10}$ and $5 \times 10^{10}$. The forest may include areas of high density or low density and specific areas may be void of nanofibers. The nanofibers within a forest may also exhibit inter-fiber connectivity. For example, neighboring nanofibers within a nanofiber forest may be attracted to one another by near forces including van der Waals forces.

Example Methods for Producing Nanofiber Forests

Various methods can be used to produce nanofiber forests in accordance with the subject disclosure. For example, in some embodiments nanofibers may be grown in a high-temperature furnace. In some such embodiments, catalyst may be deposited on a substrate, placed in a reactor and then may be exposed to a fuel compound that is supplied to the reactor. Substrates can withstand temperatures of greater than 800° C. to 1000° C. and may be inert materials. The substrate may comprise stainless steel or aluminum disposed on an underlying silicon (Si) wafer, although other ceramic substrates may be used in place of a Si wafer (e.g., alumina, zirconia, $SiO_2$ and glass ceramics. In examples where the nanofibers of the forest are carbon nanotubes, carbon-based compounds, including aliphatic hydrocarbons such as acetylene, methane and ethane may be used as a source of carbon atoms. After being introduced to the reactor, the fuel compound(s) may then decompose and the resulting carbon atoms can accumulate on the catalyst and start assembling nanotubes by growing upward from the substrate to form a forest of nanofibers.

Figure 2:
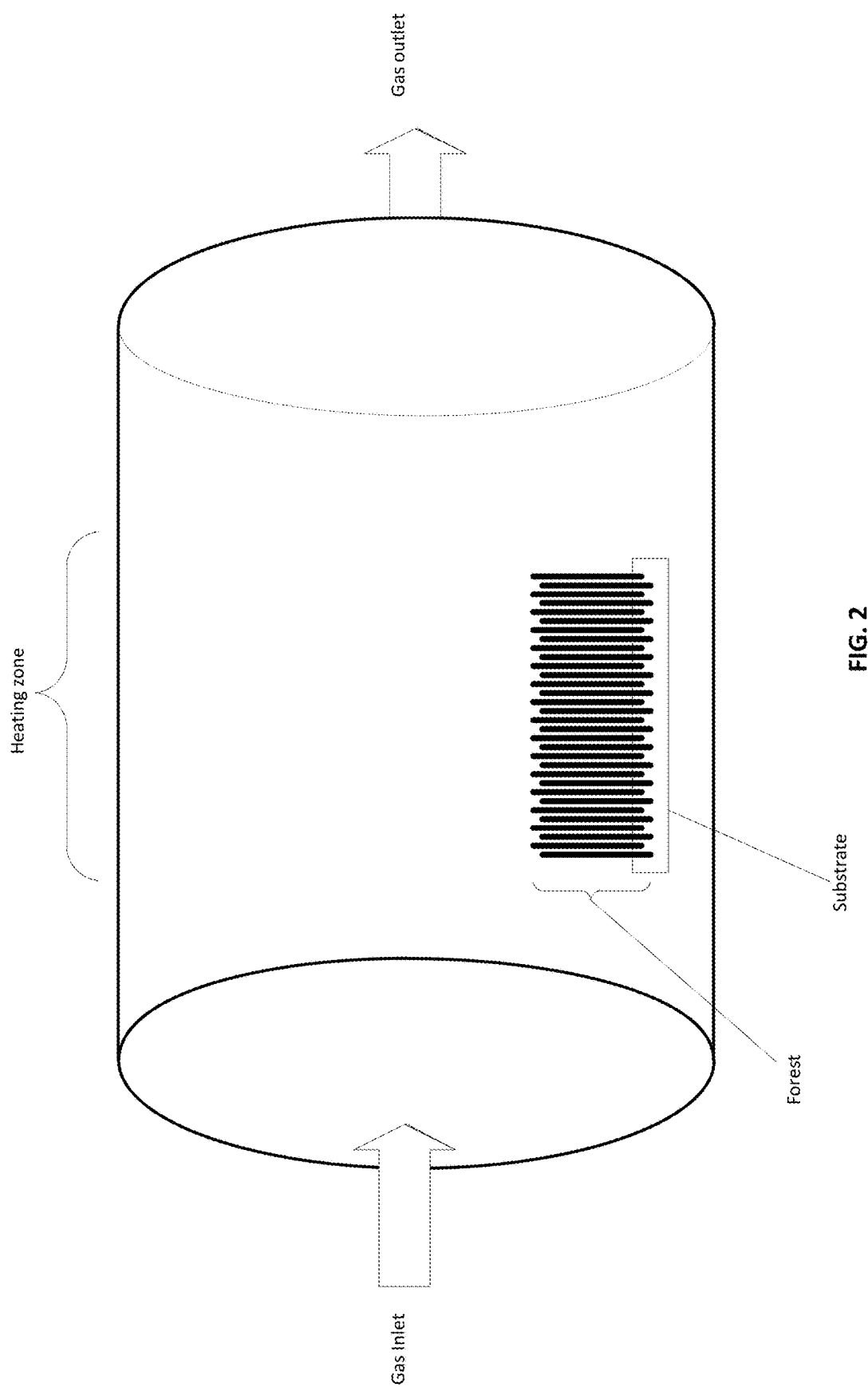
FIG. 2 is a schematic diagram illustrating one embodiment of a furnace for growing carbon nanotube forests.

A diagram of an example reactor for nanofiber growth is shown in FIG. 2. As can be seen in FIG. 2, the reactor may include a heating zone where a substrate can be positioned to facilitate nanofiber forest growth. The reactor also may include a gas inlet where fuel compound(s) and carrier gas(es) may be supplied to the reactor and a gas outlet where expended gases may be released from the reactor. Examples of carrier gases include nitrogen, hydrogen, argon and/or helium. Additionally, dopants to be incorporated in the nanofibers may be added to the gas stream. Example dopants include but are not limited to nitrogen and boron. Example methods of adding dopants during deposition of the nanofiber forest are described at paragraph 287 of U.S. Pat. No. 8,926,933, which is herein incorporated by reference in its entirety. Other example methods of doping or providing an additive to the forest include surface coating, dopant injection, or other deposition and/or in situ reactions (e.g., plasma-induced reactions, gas phase reaction, sputtering, chemical vapor deposition). Example additives include polymers (e.g., poly(vinyl alcohol), poly(phenylene tetrapthalamide) type resins, poly(p-phenylene benzobisoxazole), polyacrylonitrile, poly(styrene), poly(ether etherketone) and poly(vinyl pyrrodidone, or derivations and combinations thereof), gases of elements or compounds (e.g., fluorine), diamond, palladium and palladium alloys, among others.

The reaction conditions during nanofiber growth can be altered to adjust the properties of the resulting nanofiber forest. For example, particle size of the catalyst, catalyst pattern, reaction temperature, gas flow rate and/or the reaction time can be adjusted as needed to produce a nanofiber forest having the desired specifications. In some embodiments, the position of catalyst on the substrate is controlled to form a nanofiber forest having desired patterning. For example, in some embodiments catalyst is deposited on the substrate in a pattern and the resulting forest grown from the patterned catalyst is similarly patterned. Exemplary catalysts include iron on a buffer layer of silicon dioxide ($SiO_2$) or aluminum oxide (e.g., $Al_2O_3$). Catalyst may be deposited on the substrate using any suitable method, including chemical vapor deposition (CVD), laser-assisted CVD, plasma-enhanced CVD, electron beam (eBeam) deposition, sputtering, thermal evaporation, electrochemical methods, or atomic layer deposition (ALD). To form a pattern, in some embodiments, catalyst can be deposited in the form of the pattern and in others the catalyst can be removed or poisoned in specific areas to result in a pattern of nanotube fibers. Buffer layers may be applied to the substrate in a pattern as well and can be applied, for example, via coating, rolling, dipping, ink jet printing, pad printing or by using the physical or chemical deposition methods described above.

After formation, the nanofiber forest may optionally be modified. For example, in some embodiments, the nanofiber forest may be exposed to a treatment agent such as an oxidizing or reducing agent. In some embodiments, the nanofibers of the forest may optionally be chemically functionalized by a treatment agent. Treatment agent may be introduced to the nanofiber forest by any suitable method, including but not limited to physical deposition, atomic deposition, chemical vapor deposition (CVD) and liquid or gas infiltration. In some embodiments, the nanofiber forest may be modified to form a patterned forest. Patterning of the forest may be accomplished, for example, by selectively removing nanofibers from the forest. Removal can be achieved through chemical or physical means such as laser ablation.

Detailed Explanation of a Nanofiber Sheet

Figure 3:
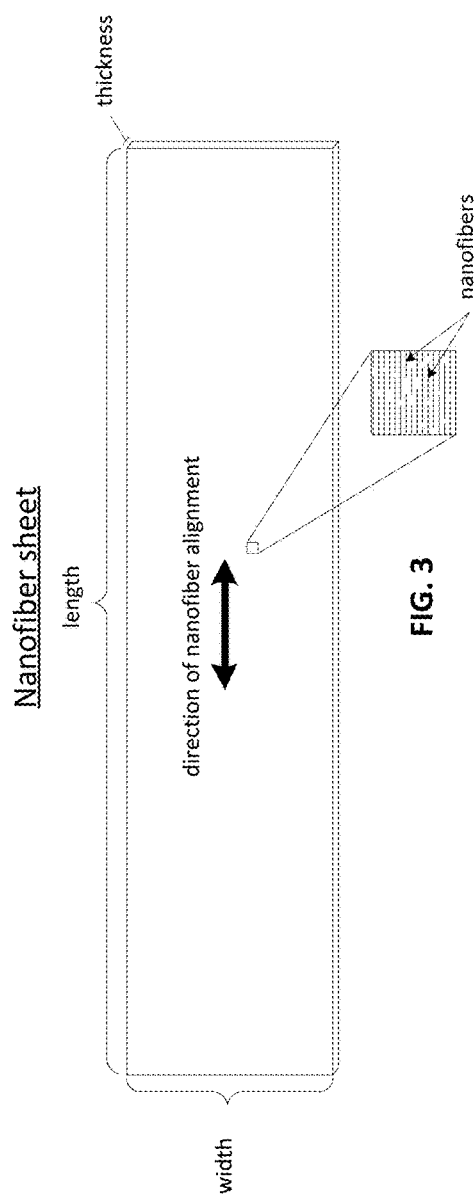
FIG. 3 depicts schematically the dimensions of an embodiment of nanofiber sheet.

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane with a length and/or width that is more than 100 times greater than the thickness of the sheet. A nanofiber sheet can have a thickness of, for example, between approximately 5 nm and 20 µm and any length and width that are suitable for the intended application. In some embodiments, a nanofiber sheet may have a length of greater than 100 m and a width of greater than 1 m. An example nanofiber sheet is shown in FIG. 3 with relative dimensions illustrated. As can be seen in FIG. 3, the direction in which the nanofibers are aligned end-to end is referred to as the direction of nanofiber alignment. In some embodiments, the direction of nanofiber alignment may be continuous throughout an entire nanofiber sheet.

Nanofiber sheets may be stacked on top of one another to form a multi-layered sheet. Nanofiber sheets may be stacked to have the same direction of nanofiber alignment or to have different directions of nanofiber alignment. Any number of nanofiber sheets may be stacked on top of one another to form a multi-layered nanofiber sheet. For example, in some embodiments, a nanofiber sheet may include 2, 3, 4, 5, 10, or more individual nanofiber sheets. The direction of nanofiber alignment on adjoining sheets may differ by less than 1°, less than 5° or less than 10°. In other embodiments, the direction of nanofiber alignment on adjoining sheets may differ by more than 40°, more than 45°, more than 60°, more than 80°, or more than 85°. In specific embodiments, the direction of nanofiber alignment on adjoining sheets may be 90°.

Figure 4:
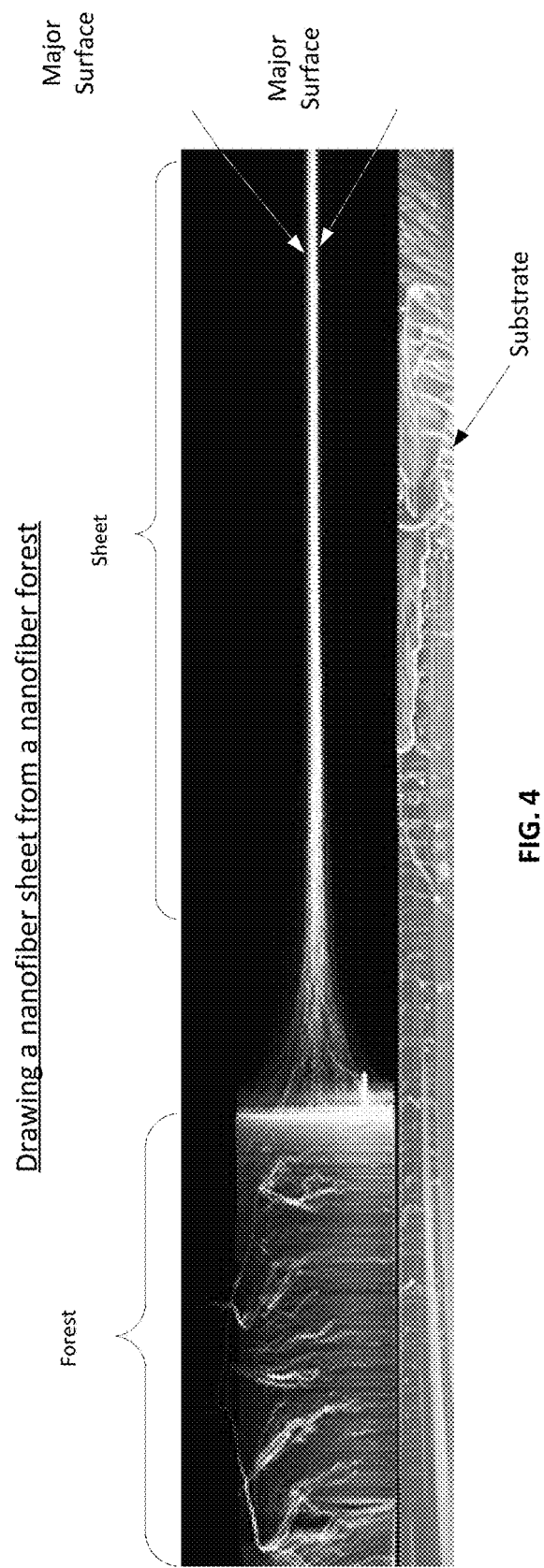
FIG. 4 is a copy of a photograph of a side view of an embodiment of a process for drawing a carbon nanotube sheet from a carbon nanotube forest.
Figure 6A:
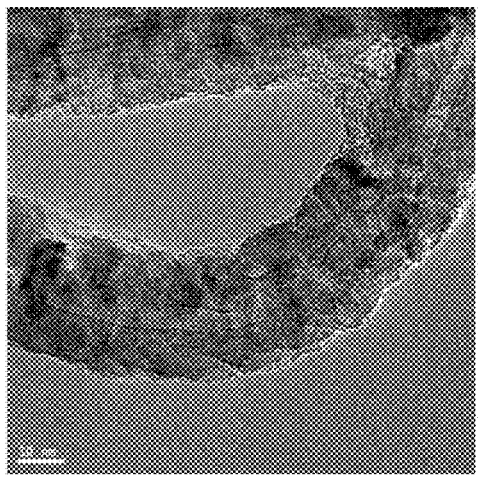
FIGS. 6A-6D are transmission electron microscope (TEM) images showing carbon nanofibers on which a buffer layer of titanium has been deposited, in accordance with an example embodiment.
Figure 6B:
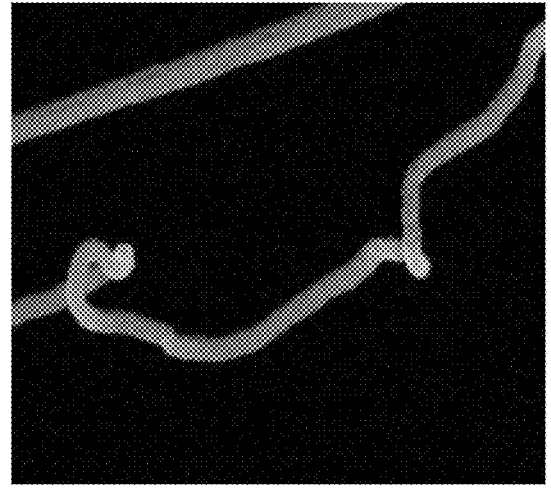
Figure 6C:
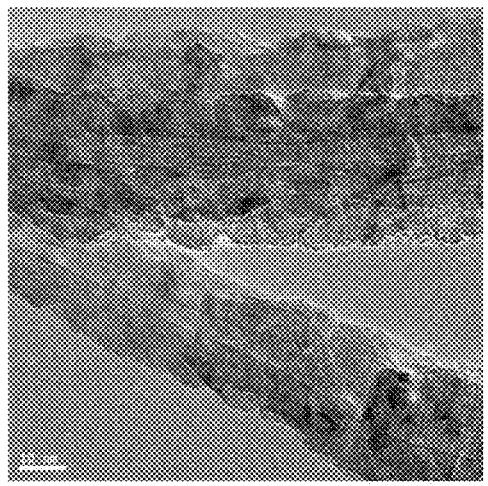
Figure 6D:
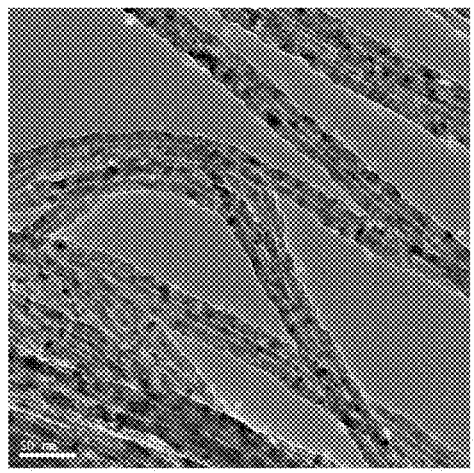
Figure 7A:
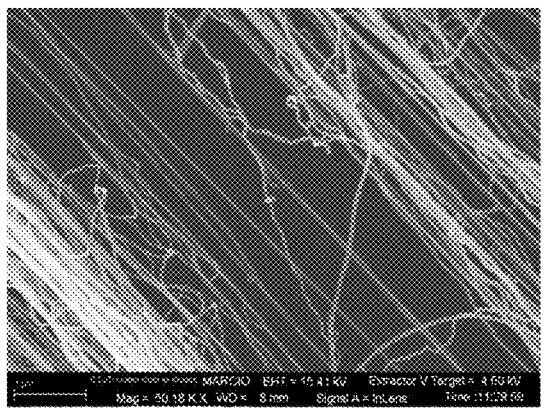
FIGS. 7A-7D are TEM images showing carbon nanofibers on which a buffer layer of titanium and a metal layer of copper have been deposited, in accordance with an example embodiment.
Figure 7B:
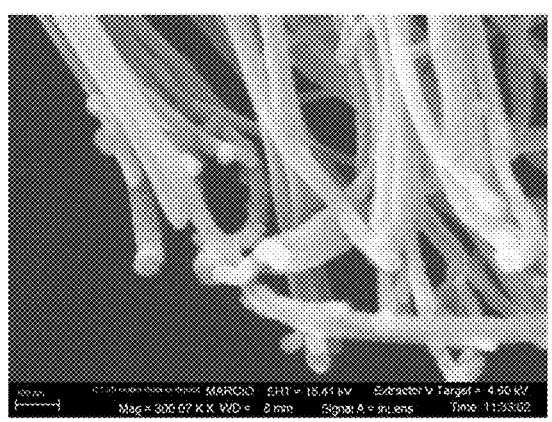
Figure 7C:
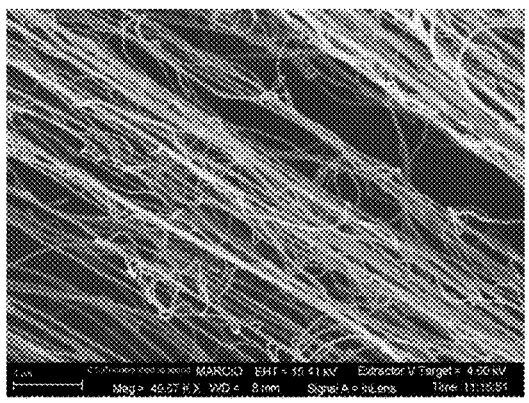
Figure 7D:
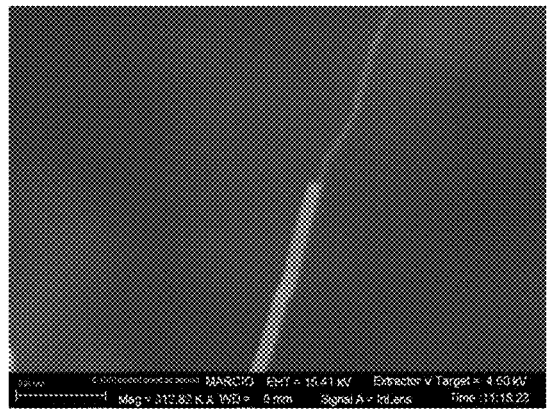
Figure 8:
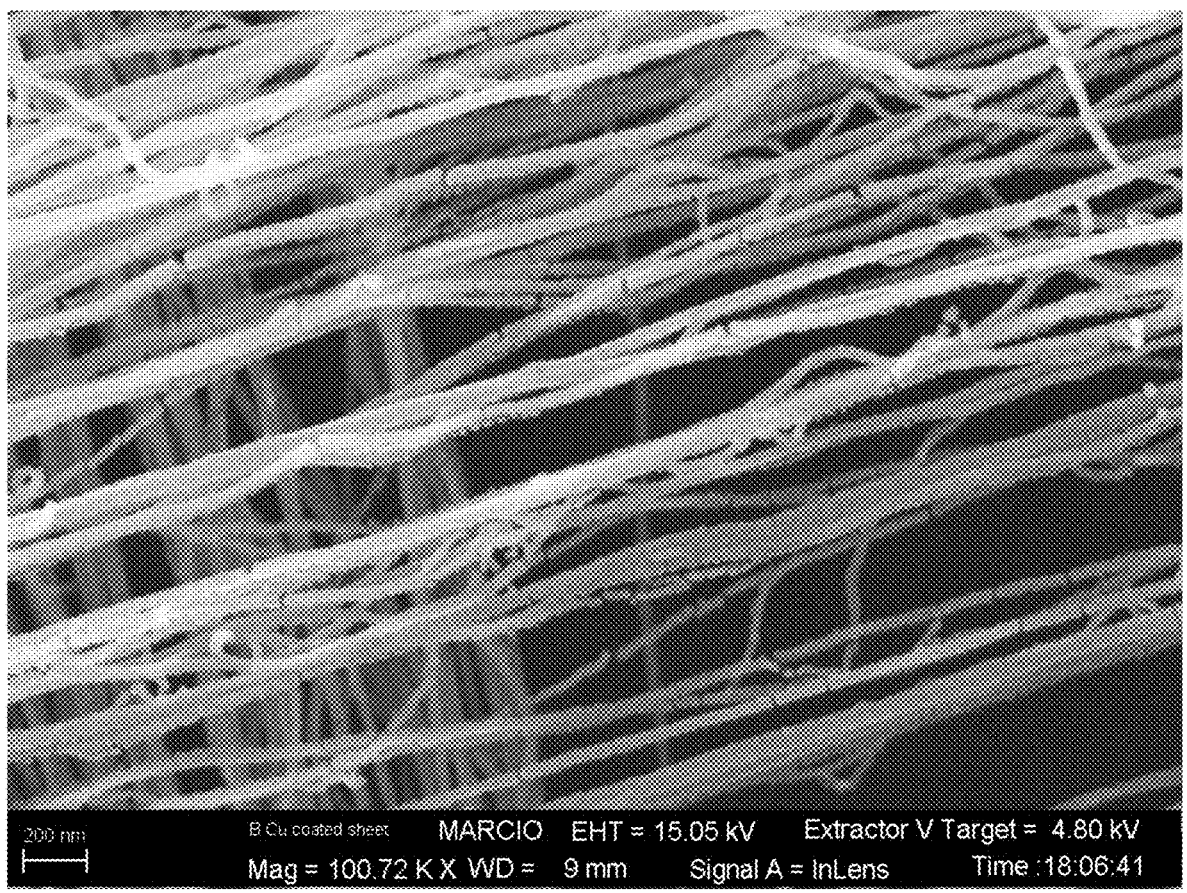
FIG. 8 is a TEM image showing carbon nanofibers on which a conformal layer of copper has been deposited, without a buffer layer of a carbide-forming metal between the carbon nanofiber and the copper layer.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 5. As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the drawing process when the desired sheet length has been achieved.

After formation, nanofiber sheets may be subjected to one or more post-treatment processes. For example, in some embodiments, the nanofiber sheets may optionally be densified. Any appropriate densification method may be used to densify a nanofiber sheet, including but not limited to exposing the nanofiber sheet to a liquid and subsequently removing the liquid (e.g., by evaporation). A liquid may be introduced to the nanofiber sheet in a variety of ways, including, for example imbibing the liquid, exposing the sheet to an aerosol of a liquid, vapor condensation, or combinations thereof. Liquids may be aqueous or non-aqueous and may be protic or aprotic solvents. Specific liquids include, but are not limited to, toluene, styrene, ethanol, ethylene glycol, acetone, methanol, isopropyl alcohol, chloroform, chlorobenzene, and n-methyl pyrrolidone. Mixtures of two, three or more liquids may also be used. Densification may affect the thickness of the sheet. In some specific examples, a nanofiber sheet may have an as drawn thickness of between 10 and 20 µm prior to densification and after densification may have a thickness of between 10 to 50 nm. Prior to densification, volume density of a nanofiber sheet may be within the range of 0.001 to 0.005 g/cm$^3$, 0.001 to 0.003 g/cm$^3$, or about 0.0015 g/cm$^3$. Using densification techniques, the volume density of various embodiments of a carbon nanotube sheet can be increased by a factor of greater than 10×, 20×, 50×, 100×, 500× or 1000×. Note that while the increase in volume density may be great, the accompanying increase in areal density may be zero or close to zero. This means that a densified sheet can have essentially the same length and width as the native sheet from which it was densified. In various embodiments, densification can result in areal shrinkage of less than 10%, less than 5% or less than 1%.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin, rendering it nearly two-dimensional. In some examples, a nanofiber sheet is between 10 and 200 nm thick (as measured within normal measurement tolerances). These thicknesses can be completely transparent to visible light in the wavelength range of 390 to 750 nm. The sheets may also be transparent to many other wavelengths of electromagnetic radiation. As used herein, a product is transparent to a wavelength or range of wavelengths if it transmits more than 95% of incident radiation of that wavelength. The inclusion of nanofiber sheets may only add minimal additional area and/or volume to a component or surface. Nanofiber sheets as disclosed herein may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon. The nanofibers and sheets may be void of aliphatic carbon and may be exclusively aryl structures forming single and multi-walled tubes, including those comprising two, three, four, five or more walls. The nanotubes, in various embodiments, can include or be limited to any of armchair, zig-zag and chiral structures.

The disclosed nanofiber composites may possess various features and properties. For example, the adhesive nanofiber composite may have low electrical resistance, in some embodiments. Specifically, in some embodiments, the electrical resistance of an example adhesive nanofiber composite may be less than 1000 Ω/square, less than 100 Ω/square, less than 10 Ω/square, less than 1 Ω/square and in some cases may be less than 0.9 Ω/square, less than 0.8 Ω/square, less than 0.7 Ω/square, less than 0.6 Ω/square, less than 0.5 Ω/square, or less than 0.1 Ω/square. The disclosed nanofiber composites may have any desired thickness. For example, in some embodiments, the disclosed nanofiber composites have a thickness of: less than 1 mm, less than 100, less than 10 µm, less than 1 µm, less than 0.5 µms, less than 0.2 µm, less than 0.1 µm, less than 50 nm, less than 40 nm, or less than 30 nm. The ratio of nanofiber sheets to adhesive may be, by volume, less than 1:5, less than 1:10, less than 1:100 or less than 1:1000. The ratio of nanofibers sheet to adhesive may be, by mass, less than 1:5, less than 1:10, less than 1:100, less than 1:1,000 or less than 1:10,000.

Deformable Composites

In different embodiments, a nanotube sheet can be joined to an outer surface of a polymer sheet, can be embedded in a polymer sheet or can be partially embedded in a polymer sheet. In other embodiments a sandwich structure can be used where one or more nanotube sheets are sandwiched between two or more polymer sheets. In the sandwich structure, two or more nanotube sheets can be directly in contact with each other. This alternating structure of one or more nanotube sheets in between two or more polymer sheets can be repeated any number of times, such as 2, 3, 4 or 5 of the structures stacked together. Different types of nanotube sheets and different types of polymer sheets can be used within the same structure. For example, a nanotube sheet can be sandwiched between a melt conformable polymer and a conductive polymer or between a melt conformable polymer and a thermoset polymer.

A nanofiber composite can include one or more polymers that are heat conformable polymers. Hot melt polymers are one type of heat conformable polymers that soften and become conforming upon heating. When cooled, they may stiffen and retain their shape. In some cases, the polymers are heated to above their $T_g$ so that they become pliable. The heat conformable polymers may be adhesives that provide adhesion between two surfaces after cooling or cross-linking. For most composites described herein, the nanofiber layer is flexible over a wide range of temperatures, so any stiffness will be provided by one or more polymer components. Although various embodiments may use thermoplastics, thermosets or a combination of both, as used herein, the term "hot melt polymer" refers to thermoplastics and other polymers that can be reversibly hardened. Thermoplastics include polyolefins such as polyethylene and polypropylene, thermoplastic polyurethanes (TPU), acrylics, acrylonitrile butadiene styrene (ABS), polycarbonate, polyvinyl chloride (PVC), polyesters, polysulphone, polyvinylidene fluoride (PVDF), polyphenylene oxide (PPO) and ethylene vinyl acetate (EVA). Hot melt polymers can have a $T_g$ of greater than 50° C., greater than 75° C., greater than 100° C., greater than 150° C., greater than 200° C., greater than 250° C. or greater than 300° C. In these and other embodiments, the polymer(s) can have a $T_g$ of less than 500° C., less than 300° C., less than 200° C., less than 100° C. or less than 75° C. Copolymers, mixtures and combinations of different polymers can be used to arrive at customized softening points.

In some embodiments, the hot melt polymer can be a hot melt adhesive (HMA). Hot melt adhesives are polymers that provide adhesion between two materials joined by the HMA. Hot melt adhesives are typically flowable when they are hot and provide an adhesive bond when cured. In some cases, hot melt adhesives can be used reversibly and adhered components can be removed after reheating the material. In other embodiments, the hot melt adhesive can be irreversible, such as with a thermoset, and materials may be permanently bonded together regardless of exposures to high temperatures. Polymers that can function as hot melt adhesives include ethylene-vinyl acetate (EVA), ethylene acrylate, polyolefins, polyamides, polyesters, polyurethanes, styrene block copolymers, polycaprolactone, polycarbonate, fluoropolymers, silicones and polypyrrole. Polyolefins may be crystalline or amorphous and include polyethylenes such as low density polyethylene (LDPE) and high density polyethylene (HDPE), polypropylene, amorphous polypropylene and polybutene. Polyurethanes include both thermoplastic polyurethane (TPU) and reactive polyurethanes.

Composites can include nanotube sheets combined with one or more planar sheets of a polymer. In these cases, the polymer will typically cover greater than 90%, greater than 95% or greater than 99% of the surface area of the nanotube sheet. In other cases, a polymer can be combined with the nanotube sheet in a discrete pattern. For example, the polymer can be applied to the nanotube sheet in stripes, dots, circles or other regular or irregular patterns. In some cases, a pattern may be applied to one side of a nanotube sheet while a complete layer of material is applied to the opposing side. A polymer pattern may cover less than 100%, less than 80%, less than 50%, less than 25% or less than 10% of the surface area of the nanotube sheet. Polymer can be applied to portions of the nanotube sheet where adhesion or electrical insulation is desired while other portions of the nanotube sheet can be left void of polymer so that electrical contact can be made with a substrate, contact or other electrically conductive material. A layer of metal may also be applied to the nanotube sheet in a pattern that does not cover the entire sheet. In other cases, a metal can be applied to the areas of a nanotube sheet that have been left void of polymer. For example, a polymer pattern may leave two contact points void of polymer and metal may be deposited onto these points to provide electrical contact with, for example, two electrodes.

Nanotube sheets can optionally be treated either before or after the formation of the polymer composite. For instance, a metallic layer can be deposited on a portion, in a pattern, or on the entirety of the nanotube sheet. The nanotube sheets can be densified either before or after the formation of the polymer composite. The surface characteristics of the nanotube sheet can also be altered by, for example, changing the surface energy of the nanotubes and the nanotube sheet. For instance, the sheet can be rendered more polymer compatible by oxidizing at least some of the exposed surface of the sheet, such as by ozonation, to produce a nanotube sheet having higher surface energy and greater adhesion capability. In other embodiments, electrical connectors can be attached to one or more portions of the nanotube sheet either prior to, or after, formation of the composite. Electrical connectors may be connected to the nanotube sheet via a metal layer and/or a buffer layer.

In one set of embodiments, a nanotube sheet can be embedded in a polymer sheet such as a heat conformable polymer sheet. The nanotube sheet can be as drawn or can be densified. The nanotube sheet can be placed on a substrate, and the substrate can be a low surface energy substrate such as PTFE or silicone. One or more sheets of polymer can be placed on the nanotube sheet, and the polymer can be softened by, for example, heating the polymer to its $T_g$ or higher. The softened polymer can infiltrate the interstices between the nanotubes of the nanotube sheet. If some of the nanotubes are coated with a metal, the polymer may preferably contact uncoated nanotubes while avoiding metal coated nanotubes. To increase infiltration of polymer and nanotubes, pressure can be applied to the nanotube/polymer stack, or vacuum can be used. For example, the stack can be placed in a press or passed through a pair of rollers.

In another set of embodiments a composite material includes a nanofiber sheet and a heat conformable polymer. The heat conformable polymer can be softened and may change shape upon heating and can be an adhesive or a non-adhesive. Heat conformable polymers can be rendered more malleable and flexible upon heating and may become stiff and less malleable upon cooling. Some heat conformable polymers will liquefy and can flow when heated. The polymer can be, for example, a thermoplastic or a thermoset polymer. The polymer and nanofiber sheet, e.g., carbon nanotube sheet, may be disposed in distinct layers or may be embedded in one another. Additional materials can be included in the composite, such as electrically conductive layers, pigments, dyes, insulators, adhesion promotors, rheology modifiers, electrical contacts and release sheets. Electrically conductive materials can include metals that can be deposited on the nanofiber sheet, on the polymer, or on the composite. Metal layers can be deposited by methods known to those skilled in the art, such as chemical vapor deposition (CVD), pressure assisted chemical vapor deposition (PCVD), electron beam (eBeam) deposition, sputtering, atomic layer deposition (ALD), and/or electroplating. The nanofiber sheets may be metallized individually or while in a stacked arrangement of more than one nanofiber sheet, in some embodiments. Metal deposition will increase the diameter of the fiber and in some cases may increase the diameter of the fiber by more than 2×, 5×, 10×, 15× or 20×. In some such embodiments where a stacked arrangement of nanofiber sheets is metallized, the metal may be deposited not only on the nanofibers of the topmost sheet but also on one or more underlying nanofiber sheets. In some embodiments, more than one metal layer may be deposited on the nanofiber sheet(s). In embodiments where the adhesive nanofiber composite is metallized, a buffer layer may be deposited on the nanofiber sheet(s) prior to deposition of the metal. In some such embodiments, a buffer layer may be deposited using any technique used to metallize the nanofiber sheet, including CVD, PCVD, eBeam deposition, sputtering, ALD and/or electroplating. In various embodiments, the buffer layer can improve adhesion, wear, electrical conductivity or reflectivity. Any material described herein with respect to buffer layer 110 may be used to form the buffer layer. Electrical contacts may be electrically connected to an electrically conductive layer. Metal layers can provide a conductive layer themselves or can act as an electrical connector to the nanofiber sheet. For example, a CNT sheet can be embedded in a polymer while an integral metal layer provides for low resistance electrical contact between the CNT sheet and an external electrical contact. In the absence of the metal layer, the polymer layer may block access and prevent effective electrical contact with the CNT sheet. While the CNT sheet may exhibit surface characteristics that allow the polymer to isolate it, a metal layer may be less compatible with the polymer and therefore may shed polymer as it is applied and provide a polymer-free electrical interface to the CNT sheet.

Nanofiber sheets such as CNT sheets can exhibit excellent properties such as tensile strength and flexibility, but in many instances these sheets can be easily abraded through friction with adjacent materials. A composite that includes a polymer and a nanofiber sheet can retain the strength properties of the nanofiber sheet while protecting it from abrasion. The polymer can be laminated onto one or both sides of the nanofiber sheet or, in some embodiments, the polymer can be embedded in the nanofiber sheet, or the nanofiber sheet can be embedded into the polymer. In other embodiments, a polymer layer can be extruded onto a nanofiber sheet. In further embodiments, the polymer layer and the nanofiber sheet may be joined together when the polymer is extruded, in a process analogous to co-extrusion. For instance, nanofiber sheets can be formed using the methods described herein in a process that is run in parallel with a polymer extruder. As the nanofiber sheet and polymer sheet are produced, they can be laminated together to form the composite. As the polymer sheet is typically flowable or below its glass transition temperature ($T_g$) as it exits the die, it can be embedded into the nanofiber sheet as the two components pass through a pair of rollers. Speed, pressure and temperature can be adjusted to determine, for instance, the thickness of the composite and the amount of embedding of the polymer in the nanofiber sheet. Additional layers of either nanofiber sheets or polymer can be added so that in some embodiments the nanotube sheet is a middle layer surrounded by two polymer layers. The nanofiber sheet can be densified before or after the composite is formed. In some cases, the polymer can also provide densification to the nanotube sheet.

In another set of embodiments, the nanofiber sheet may be dipped in liquid polymer or pre-polymer in order to saturate and imbibe the nanofiber sheet with polymer. The process can be a continuous belt process with the nanofiber sheet passing through the liquid or dispersed polymer or pre-polymer. The saturated sheet can then, for example, pass through a nip, doctor blade or a pair of opposed rollers to remove excess polymer and to define the thickness of the composite. The polymer component can then be hardened, polymerized, or cured so that the composite can be handled and stored.

In many embodiments, the nanofiber composite can be conformed into multiple shapes. The composite can provide a heat moldable, electrically conductive sheet that can be quickly molded to a regular or irregular surface. The composite can be joule heated by applying current across the conductive nanofiber sheet. In other applications, the composite can be heated externally using, for example, hot air or infrared radiation. In yet another embodiment, the composite can be heated inductively by applying a magnetic field to the composite. The conductive nanofiber sheet component of the composite allows the composite to be used in EMI shielding around electronic components or other devices sensitive to electromagnetic radiation. The nanofiber composite can also be used as an antenna. The flexibility of the composite allows it to be molded around irregularly shaped objects that may otherwise be difficult to enclose in a conductive sheet.

As illustrated in the embodiment of FIGS. 9A through 9G, a nanofiber sheet can be combined with a buckled conformable polymer sheet to provide a composite that is stretchable and can be stretched in one or more directions to enable conformance with a variety of shapes. In FIG. 9A, elastic layer 900 is placed in tension in one or more directions, depending on the desired capabilities of the end product. Examples of an elastic material include rubber materials, such as a silicone rubber, a urethane rubber, a fluorocarbon rubber, a butyl rubber, a butadiene rubber, an isoprene rubber, a chloroprene rubber, an acrylic rubber, a nitrile rubber, an epichlorohydrin rubber, a latex, a styrene-butadiene rubber, an ethylene-propylene rubber, and a natural rubber. Additional examples of an elastic material include resin materials (for example, a thermoplastic elastomer), such as a silicone resin, a fluorocarbon resin, a polyurethane resin, a polystyrene resin, a polyolefin resin, and a polyamide resin.

In FIG. 9B, heat conformable polymer layer 910, which can be a hot melt adhesive, is applied to elastic layer 900, while it is in tension, to form composite 950. FIG. 9B illustrates schematically what composite 950 of FIG. 9B looks like after the tension in the system has been relieved. In FIG. 9D, elastic layer 900 has been removed from the composite, leaving a buckled layer of heat conformable polymer 9D. In FIG. 9E, nanofiber layer 950 has been placed on buckled heat conformable polymer 910 to form composite 960. Nanofiber layer 950 can be optionally densified at this stage, for example, by chemical or mechanical densification. The two layers may be adhered together by, for example, applying heat. In some cases, an additional layer of heat conformable polymer may be placed on the nanofiber layer 950 so that nanofiber layer 950 is not exposed. FIGS. 9F and 9G provide examples of how composite 960 can be lengthened to use the composite in a variety of applications. In some cases, composite 960 can be heated to soften heat conformable polymer layer 910, but in many embodiments, composite 960 is not elastic but can be stretched due to the pre-buckling of heat conformable layer 910. Note that the buckling is on a microscopic scale and in many cases is not observable by the human eye. See FIGS. 11A and 11B for micrographs of what a buckled nanofiber sheet looks like. The nanofiber sheet can be placed on the buckled sheet in any orientation. For example, the nanofibers can be aligned so that their axis is along the stretch axis of the heat conformable layer (from left to right in FIG. 9E) or so that they are at 90 degrees to the stretch axis (into the page looking at FIG. 9E). Any configurations in between 0° and 90° can also be used. Multiple nanofiber sheets may be stacked in the same or different orientations with respect to the heat conformable layer. A binder can be used between the nanofiber sheet and the heat conformable layer in some embodiments.

Figure 10:
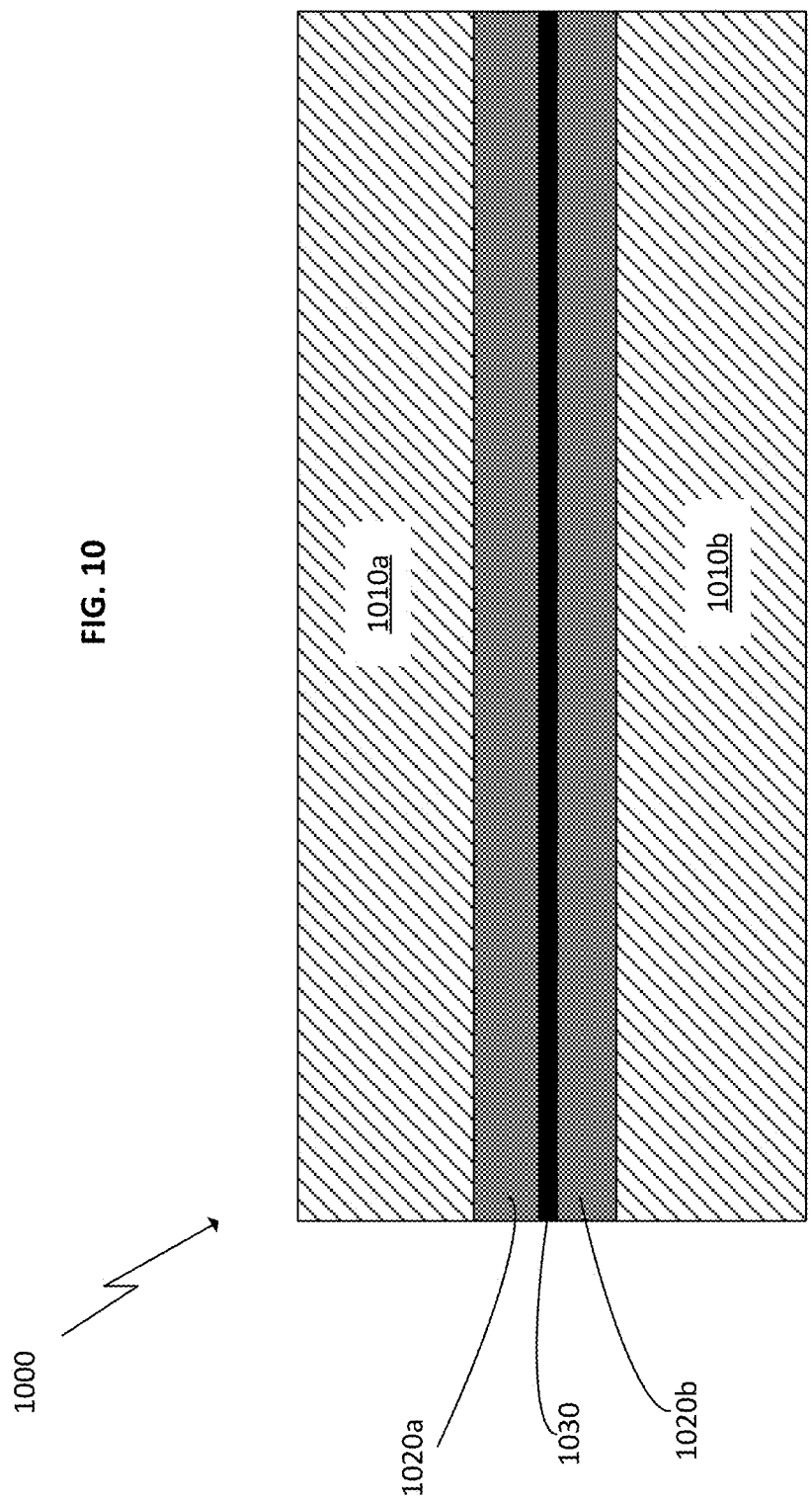
FIG. 10 is a cross-sectional view of another embodiment of a nanofiber composite.

In another embodiment such as that shown in FIG. 10, composite 1000 comprises a nanofiber sheet 1030 sandwiched between two sheets of glass, 1010a and 1010b. The nanofiber sheet can be a carbon nanotube sheet. Additional layers, such as adhesive sheets 1020a and 1020b as well as metals (metals) may also be included. The adhesives can keep the components sandwiched together while metal layers may add functionality such as electrical conductivity, IR absorbance or IR reflectance. The nanofiber sheet may be conductive but also translucent or transparent, particularly to visible light. As a result, visible light may pass through a three, four, five or more layer composite (in any order) of glass/polymer adhesive/nanofiber sheet/polymer adhesive/glass. In other embodiments, one adhesive sheet may be used or the adhesive may be embedded in the nanofiber sheet, providing a single layer that comprises two components. The electrical conductivity of the nanofiber sheet can provide protection against electronic eavesdropping and can help prevent the transmission of electromagnetic radiation while maintaining good optical transparency. Furthermore, the nanofiber layer can provide improved strength and shatter protection, resulting in an explosion resistant window. Applications include, for example, windows for government and private buildings that may be subject to attack both electronically and physically. In other embodiments, the composite can function as a windshield or window, and electric current applied to the nanofiber layer can heat the windshield to provide immediate defrosting or deicing. Additional layers may include, for example, adhesives, pigments or dyes. Adhesives include polymers such as those made from polyvinyl alcohol including polyvinyl butyral (PVB) and polyvinyl formal (PVF). These and other adhesives can be provided in sheet form. These polymers that can be laminated between opposing sheets of glass and can be bonded by applying heat, pressure or both. Adhesive layers 1020a and 1020b can be melted or softened to render them tacky. Upon cooling, the adhesive may permanently or temporarily bind the layers together. The heating process can improve the clarity of the adhesive, making it useful for windshield or window use. In some embodiments the adhesive can be, for example, a thermal cure, radiation cure or evaporative cure polymer system. One or more of the glass sheets can be replaced by other transparent materials such as transparent ceramics like sapphire, or transparent polymers such as polycarbonate. As a result, the nanofiber sheet can be retained between two opposed pieces of transparent material that are securely joined together. Composite 1000 can also include one, two or more electrical contacts for providing current to the nanofiber sheet or to provide electrical grounding.

The embodiments discussed herein are discussed primarily in composite configurations that comprise a single nanofiber sheet and a single polymer layer. However, composites comprising multiple layers of nanotube sheets, polymer layers, or both, may be used. For example, a single nanofiber sheet can be sandwiched between two polymer layers that may be the same or different. Alternating layers of nanofiber sheets and polymer layers may be produced that include one, two, three, four or more layers of each. In a multiple layer composite, the outermost opposed layers may be two polymer layers, two nanofiber layers or a combination of a polymer layer and a nanofiber layer. In other embodiments, one or both outer layers of the composite can be a third material such as metal, glass, glass fibers or ceramic.

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

The invention claimed is:

1. A nanofiber composite comprising:
   a nanofiber sheet comprising carbon nanotubes aligned end to end in a plane of the nanofiber sheet;
   a conformal buffer layer of a carbide forming metal on surfaces of the carbon nanotubes within the sheet;
   a conformal layer of an electrically conductive metal on the conformal buffer layer, wherein the nanofiber sheet has an electrical resistance of less than 1000 ohms/square; and
   a heat conformable polymer layer adhered to the nanofiber sheet.

2. The nanofiber composite of claim 1, wherein the nanofiber sheet has an average thickness of less than 100 nm.

3. The nanofiber composite of claim 1, wherein the nanofiber sheet is embedded in the polymer layer.

4. The nanofiber composite of claim 1, further comprising a metal layer on a surface of the nanofiber sheet.

5. The nanofiber composite of claim 4 wherein at least a portion of the metal layer is exposed through the polymer layer.

6. The nanofiber composite of claim 1, further comprising a plurality of nanofiber sheets.

7. The nanofiber composite of claim 6, wherein each of the plurality of nanofiber sheets are in electrical contact with each other.

8. The nanofiber composite of claim 6, wherein the plurality of nanofiber sheets are electrically isolated from each other.

9. The nanofiber composite of claim 6, wherein at least one conformable polymer layer is layered between the plurality of nanofiber sheets.

10. The nanofiber composite of claim 1, wherein the composite transmits greater than 98% of visible light at 90° to a surface of the nanofiber composite.

11. The nanofiber composite of claim 1, further comprising a glass or ceramic or transparent polymer.

12. The nanofiber composite of claim 1, wherein the heat conformable polymer layer comprises polyvinyl butyral, or ethylene-vinyl acetate.

13. The nanofiber composite of claim 1, wherein the composite comprises a vehicle windshield or window.

14. The nanofiber composite of claim 1, wherein the conformal buffer layer comprises titanium and the electrically conductive metal is copper.

15. The nanofiber composite of claim 1, wherein the carbon nanotubes at an exposed surface of the nanofiber sheet comprise an oxide layer.

16. The nanofiber composite of claim 1, wherein the heat conformable polymer layer is buckled.

* * * * *